INVENTORS
CHARLES A. HAUDENCHILD
NICHOLAS G. SANDRU
BY:
Oldham & Oldham
ATTORNEYS

# United States Patent Office 3,567,563
Patented Mar. 2, 1971

3,567,563
LIGHTWEIGHT, HIGH STRENGTH CORE MATERIAL IN A STRUCTURAL PANEL
Charles A. Haudenchild, Cuyahoga Falls, and Nicholas G. Sandru, Canton, Ohio, assignors to Goodyear Aerospace Corporation, Akron, Ohio
Filed Dec. 26, 1968, Ser. No. 786,910
Int. Cl. B32b 21/00
U.S. Cl. 161—37     5 Claims

ABSTRACT OF THE DISCLOSURE

A lightweight, high strength sandwich core material which is in a substantially flat sheet form having a plurality of uniformly spaced holes positioned perpendicular to one surface thereof and extending between 85% and 95% of the thickness of the sheet towards the other surface. In the preferred embodiment of the invention, the material making up the sheet is redwood with the grain of the redwood running perpendicular to the surfaces thereof, and with the entire sheet of redwood made up of a plurality of blocks mosaic together in a random pattern where there is no continuity of joint lines. The core is normally sandwiched between out skins or facings and intimately fixed to each other. The continuous surface of the core is positioned to receive most impact and compressive forces. The positioning of the core determines the most impact resistant surface.

---

Heretofore it has been known that lightweight core materials are extremely desirable in structural members when such cores provide sufficient compressive strength to meet requirements of strength and rigidity in combination with light weight. Prior attempts at aluminum honeycomb, and balsa wood core materials have been common in this field. The instant invention deals with an improved, higher strength, core configuration that represents an improvement in this art.

Therefore, it is the general object of the present invention to meet the needs of improving the core art by the provisions of a core preferably made from wood formed to a large flat sheet with the grain of the wood running perpendicular to the surfaces of the sheet, and where a plurality of holes are drilled at a substantially perpendicular direction into one surface of the sheet to a point between 85% and 95% of the thickness of the sheet, with such holes uniformly arranged over the surface in any geometric pattern desired to give the sheet a lightweight, but high strength structural configuration. Normally, the holes are drilled in such configuration and size so as to reduce the weight of the sheet by about 50%.

Another object of the invention is to utilize a domestic wood. But, since no domestic woods are in the required density range, the invention utilizes a mechanical method of reducing the weight by approximately 50%. The lightest domestic structural woods exceed 20 lbs./cubic foot.

For a better understanding of the invention, reference should be had to the accompanying drawings wherein.

Figure 1:
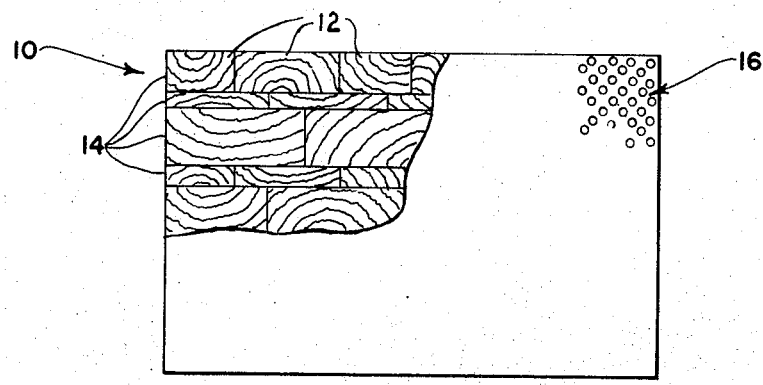
FIG. 1 is a plan view of a rectangular sheet showing the preferred embodiment of the invention with respect to the formation of the wood making up the sheet and the holes drilled therein.

With reference to the form of the invention illustrated in the drawings, the numeral 10 indicated generally a core which is rectangular in shape and substantially flat and thin. In the preferred embodiment of the invention, the sheet is made up of a plurality of wooden blocks indicated generally by numeral 12 which are arranged in a somewhat random fashion of wider and narrower sections shown by layers 14 where the grain of the wood runs substantially perpendicular to the surfaces of sheet 10.

The lightweight configuration of the invention is then achieved by drilling, or otherwise forming a plurality of holes, indicated generally by numeral 16 from one surface of sheet 10 substantially perpendicular thereto and towards the other surface of the sheet between about 85% and 95% of the thickness of the sheet. The holes 16 are substantially equally spaced across the entire surface of the sheet, but arranged in a geometric pattern depending upon the compressive strength requirements of the sheet. Normally, the invention contemplates that the holes will reduce the weight of the sheet by about 50%.

Figure 2:
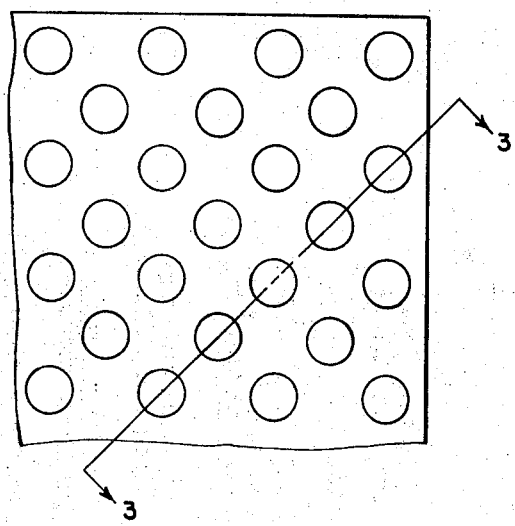
FIG. 2 is an enlarged broken away plan view showing the hole arrangement of the sheet of FIG. 1.
Figure 3:
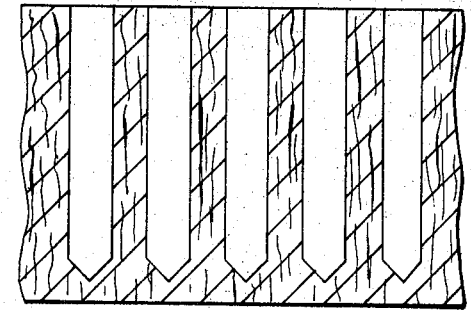
FIG. 3 is an enlarged elevation of the sheet of FIG. 1 taken one line 3—3 of FIG. 2.

Preferably, the holes are arranged running in diagonal lines as shown in FIG. 2 of the drawings with the spacing between adjacent holes in the diagonal lines being considerably less than the spacing between adjacent holes in lines parallel to the sides of the sheet. For example, a spacing of ½ inch between adjacent holes on lines running parallel to the edges of the sheet with adjacent rows of holes being positioned at ¼ inch offsets in both the length and width configurations of the sheet will achieve the pattern desired and shown in FIG. 2 of the drawings. For the dimensional configuration defined above, the holes themselves are approximately .3 inch in diameter. The thickness of the sheet is approximately 2 inches with the holes being drilled to a depth of between 1.8 inches and 1.95 inches.

The invention particularly contemplates utilization of redwood in the preferred embodiment with the redwood blocks 14 appropriately glued together as shown in FIG. 1 of the drawings with the grain of the redwood running perpendicular to the surface of the sheet body 10. It has been found that ganged drilling of the holes is probably the easiest and most economical way to achieve the required pattern, although a burning application could also be utilized.

Figure 4:
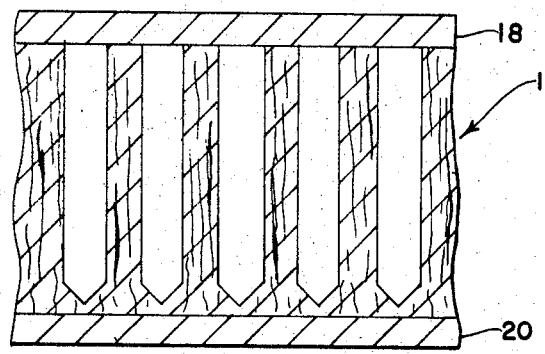
FIG. 4 is a broken away cross sectional elevation showing the use of the core material sandwiched in laminated relation between skins or covering sheets.

FIG. 4 illustrates the core body 10 position between metallic skins 18 and 20, which are appropriately laminated into position to give a structurally integral lightweight, high strength panel to be used as desired. However, in the preferred use of the panel, the continuous surface of the core should be positioned to receive any blows, impact, or compressive forces to which the panel may be subjected.

The panel is a laminated construction comprising a combination of alternating dissimilar simple or composite materials assembled and intimately placed in relation to each other so as to use the properties of each to attain specific structural advantages of the whole assembly.

Thus, it should be seen that the objects of the invention have been achieved by providing a core structure, preferably made from wood, and with redwood being the preferable wood because of its higher compressive strength to weight ratio, arranged to a desired configuration, and with the grain of the wood running in the direction of giving greatest compressive strength to the material. However, it should be understood that the material of the core can be not only wood, but plastic with holes drilled or molded therein, metal, etc. If metal or plastic are utilized, the material should be arranged to present the direction of greatest compressive strength perpendicular to the surface. Holes should also be drilled or formed in the metal or plastic cores to about the same dimensions set forth above. In either case, the continuous surface of the sheet provides much greater impact resistance than a sheet which is drilled clear through and then laminated to surface skins in the usual manner. The purpose of the invention is to provide a core with greater impact resistance on one face than the other. Also, the continuous face allows a much better lamination of the skin because of the 100% bonding area. This also increases impact resistance.

Various hole configurations can be used, with both size and spacing varying, depending upon the weight requirements in combination with the compressive strength requirements.

While in accordance with the patent statutes only one best known embodiment of the invention has been illustrated and described in detail, and it is to be particularly understood that the invention is not limited thereto or thereby, but that the inventing scope is defined in the appended claims.

What is claimed is:
1. A lightweight, high strength core which comprises: a substantially flat body having a plurality of uniformly spaced holes positioned perpendicular to one surface thereof and extending between 85% to 95% of the thickness of the body towards the other surface, said body made from wood with the grain of the wood extending substantially perpendicular to the surface of the body and parallel to the holes drilled therein.

2. A core according to claim 1 where the wood is made up from a plurality of blocks adhesively secured together in a random patch work configuration.

3. A core according to claim 2 where the holes amount to about 50% of the original volume of the body.

4. A core according to claim 3 where the wood is redwood.

5. A core according to claim 4 which includes a skin material secured in laminated relation to both surface areas of the body to form a structural panel having one surface more resistant to compressive impact.

References Cited

UNITED STATES PATENTS

| | | | |
|---|---|---|---|
| 3,216,167 | 11/1965 | Roberts | 161—113UX |
| 3,287,203 | 11/1966 | Elmendorf | 161—268X |
| 3,444,956 | 5/1969 | Gaffney | 161—113X |
| 2,479,870 | 8/1940 | Jensen | 52—615 |
| 2,479,870 | 8/1949 | Rundquist | 52—615 |
| 2,354,725 | 8/1944 | Weyerhaeuser | 52—615X |

PHILIP DIER, Primary Examiner

U.S. Cl. X.R.

161—39, 56, 113; 52—615; 156—252